United States Patent [19]
Zimmerer et al.

[11] 3,983,898
[45] Oct. 5, 1976

[54] IRRIGATION SYSTEM

[75] Inventors: Arthur L. Zimmerer, Lindsay; Charles H. Meis, Genoa, both of Nebr.

[73] Assignee: Lindsay Manufacturing Company, Lindsay, Nebr.

[22] Filed: June 12, 1975

[21] Appl. No.: 586,237

[52] U.S. Cl. .................................. 137/344; 239/177
[51] Int. Cl.² ........................................... B05B 3/00
[58] Field of Search ............ 137/344; 239/212, 213, 239/177

[56] References Cited
UNITED STATES PATENTS

| | | |
|---|---|---|
| 3,394,729 | 7/1968 | Bower et al. ........................ 137/344 |
| 3,738,687 | 6/1973 | Zimmerer et al. .............. 137/344 X |

*Primary Examiner*—Alan Cohan
*Attorney, Agent, or Firm*—Kinzer, Plyer, Dorn & McEachran

[57] ABSTRACT

This is concerned with a center pivot irrigation system made up of a series of pipe units flexibly interconnected end to end and supported by a series of towers which may be self-propelled with a coupling between adjacent sections which allows each section to rotate freely about its own axis relative to the other sections with substantial angulation between adjacent pipe sections in both a vertical direction and a horizontal direction.

18 Claims, 6 Drawing Figures

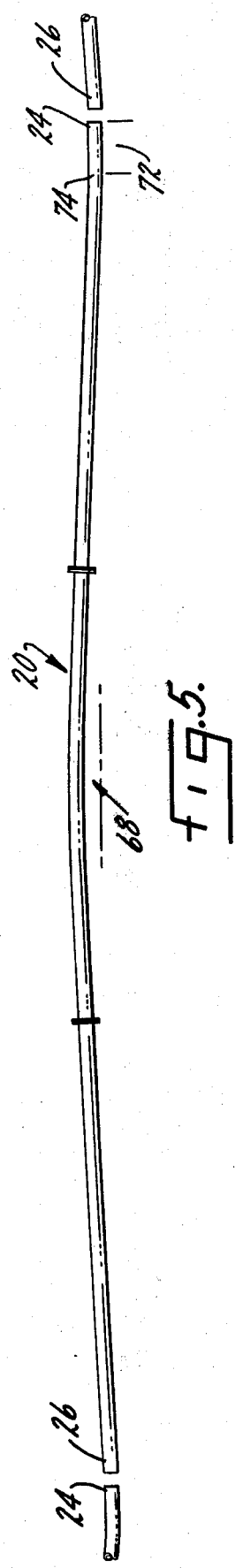
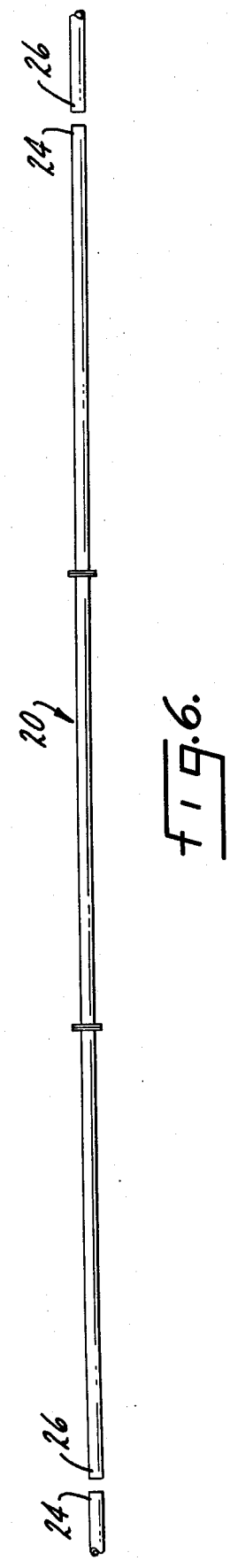

IRRIGATION SYSTEM

SUMMARY OF THE INVENTION

This invention is concerned with a center pivot irrigation system and is more specifically concerned with a series of individual pipe units which are flexibly connected end-to-end through a joint which signals the individual sections to move with an elongated coupling that minimizes if not eliminates any error in the creation of a signal.

A primary object is a coupling arrangement that causes the signaling device to react accurately and quickly.

Another object is a coupling arrangement or unit of the above type which is inexpensive to manufacture, can be fabricated, and does not require any machine fits.

Another object is a center pivot unit of the above type which will respond rapidly and accurately regardless of which direction the unit is pivoting in.

Another object is a center pivot unit of the above type which is both accurate and inexpensive.

Other objects will appear from time to time in the ensuing specification and drawings.

BRIEF DESCRIPTION OF THE DRAWINGS

FIG. 5 is a side view of a pipe used in the system; and

FIG. 6 is a top view of FIG. 5.

DESCRIPTION OF THE PREFERRED EMBODIMENT

Figure 1:
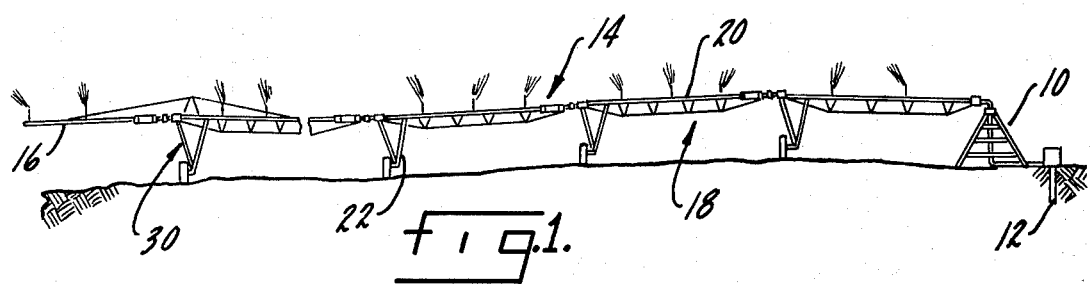
FIG. 1 is a side view of a center pivot irrigation system.

In FIG. 1 a conventional center pivot irrigation system is shown which may include a center pivot 10 in the form of an upright connected to a source of water supply 12 with an elongated pipe string 14 extending outwardly therefrom to an end or overhang 16 supported at intervals on wheels so that it may rotate about the pivot 10. This system may be considered to be made up of a series of pipe units 18, each of which includes an elongated pipe section 20 supported at one end by a self-propelled tower 22, with the other end 24, which may be considered the free end, connected into the tower end of an adjacent section by a coupling, to be described in detail hereinafter.

The tower end 26 of one section is coupled to the free end 24 of the next outboard section through a flexible split coupler 28, such as in Ser. No. 484,442, filed July 1, 1974, which, in addition to sealing the two pipe ends relative to each other so that water does not leak, also positions the pipe extremities in spaced relation and allows certain angulation of one pipe relative to the other, throughout the full 360° circumference of the pipe, to an amount that may run on the order of 15°–30° of one pipe section relative to the other so that the entire system may travel over hills, valleys, and uneven terrain.

Figure 2:
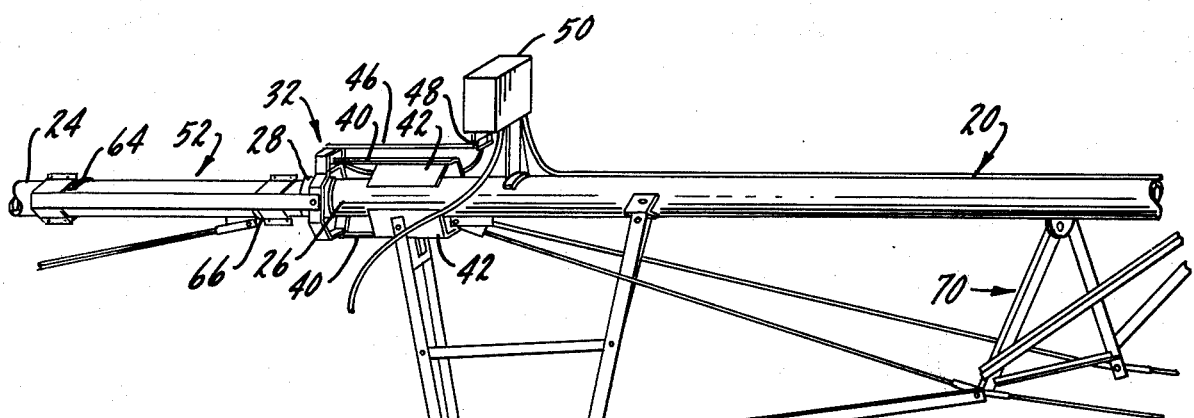
FIG. 2 is a perspective of a coupling at one end of a pipe unit.
Figure 3:
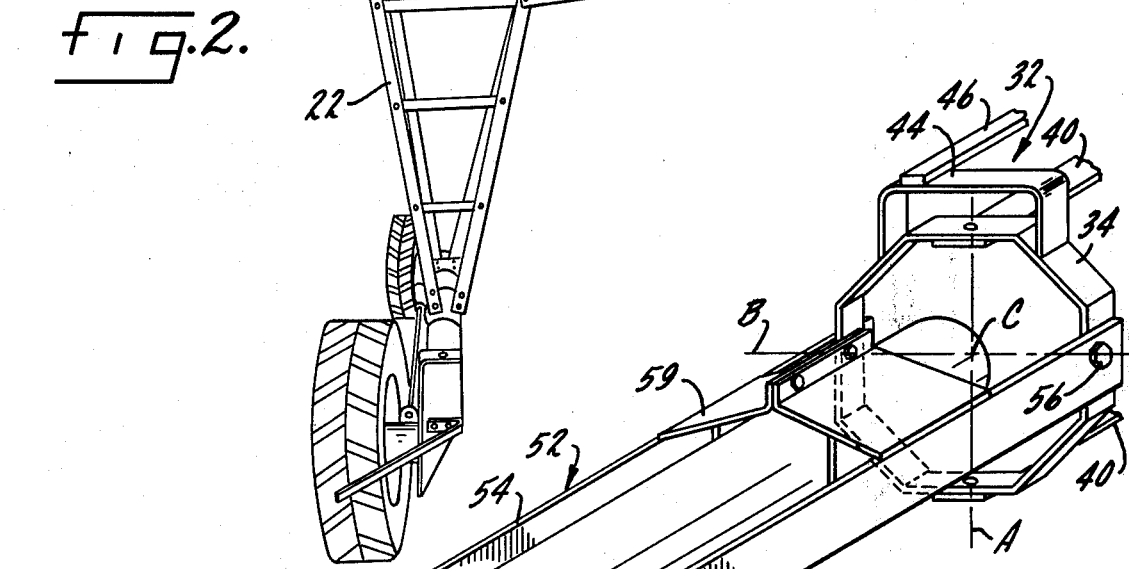
FIG. 3 is a perspective, on an enlarged scale, of a part of the coupling of FIG. 2.
Figure 4:
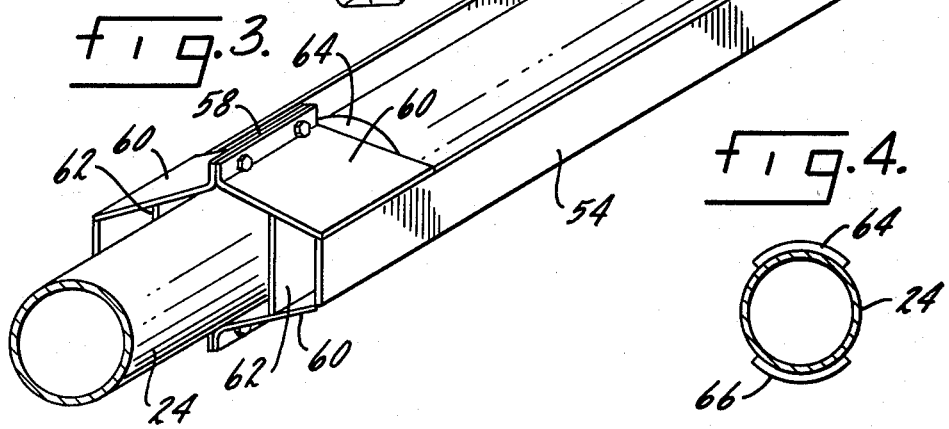
FIG. 4 is an end view of a component.

The outermost tower 30 may be programmed to move at a certain speed, either continuously or in steps or intervals, and its angulation relative to the next inboard pipe section will be sensed or detected through a flexible joint 32 which detects the forward angulation of the outer pipe section 30 and operates the electric motor that drives the next inboard tower, causing it to move forward on a step-by-step basis as signaled by its flexible joint. This forward movement of the next inboard pipe section will in turn be detected by a similar if not identical flexible joint at the next inboard pipe section causing it to move forward on a step-by-step basis, and so forth into the center pivot. The flexible joint may be of the type shown in U.S. Pat. No. 3,738,687, issued June 12, 1973, and assigned to the present assignee, and should be constructed to allow both vertical and horizontal angulation of one pipe section relative to another, with the horizontal angulation causing a signal to energize the drive motors on the towers. In FIGS. 2 and 3 such a function may be acquired by providing a gimbal ring 34 around the sealing coupler 28 with side straps 40 connected thereto both above and below and extending along the tower end of one section to brackets or supports 42 which may be welded or otherwise suitably connected to the pipe. The gimbal ring has a riser 44 which has an arm 46 connected thereto to operate a switch 48 on control box 50 which in turn supplies current to the tower motor. The ends of the straps of extensions 40 are connected to the gimbal ring so as to pivot on a vertical axis A.

An elongated sleeve or coupling 52 is provided on the other side of the gimbal ring for the pipe end of the adjacent pipe unit and may take the form of straps or extensions 54 on each side of the pipe end connected to the gimbal ring as at 56 with boxes 58 and 59 at spaced intervals therealong. The connection at 56 also affords a pivot on a horizontal axis B which intersects the vertical axis A at what may be considered a focal point C. Each box 58 and 59 may have sloping side pieces 60, both above and below, and suitably connected together on top and bottom by screws or bolts or the like and on the sides along the edge of the straps or extensions 54 by welding or otherwise to provide a V-shaped top and bottom for a pipe end 24 to rest in. Vertical walls 62 inside of the boxes may be welded top and bottom to the sloping walls and may be suitably spaced so as to provide a snug fit with the sides of the pipe end 24.

The pipe end 24 of an adjacent pipe section has two stops or abutments, one 64 on top next to the outboard box 58, and the other 66 on the bottom and next to the inboard box 59. Since the weight of a pipe section will be basically on the tower which is on the outboard end, the inboard end of the pipe will tend to settle or drop, which will cause any slack between the pipe end 24 and the boxes to be on the top as to the inboard box 58 and on the bottom as to the outboard box 59. Vertical clearance may be provided, which is to say the boxes may be over-sized vertically so that the pipe end with the stops may be threaded through the outboard box 58 until the bottom stop 66 contacts the inboard box, at which point the top stop 64 will be inside of the outboard box 58. Then the unit may settle which will interlock the pipe end of one unit with the tower end of the other. Whereas there may be some vertical clearance between the pipe end 24 and the boxes, it will be understood that there is no side clearance, which is to say that the walls 62 inside of the boxes are fairly snug on both sides of the pipe and with the outboard and inboard boxes spaced substantially, as shown in FIG. 3, there will be no clearance or looseness between the pipe end 24 and the gimbal ring. This means that angulation of the next adjacent outboard pipe section will be immediately communicated to the flexible joint and the signaling device of the next adjacent inboard pipe section.

As indicated in FIG. 5, the pipe between the towers is arched up somewhat in a vertical direction, but not arched or bent in a horizontal direction, as shown in FIG. 6. For example, in a span of, say, 125 ft. or so, it might be pre-arched two feet at the center, as at 68, which, when the pipe is full of water, might cause it to sag down to a 1 ft. arch. The pipe itself would not necessarily be bent or formed into the preset curve or arch but, rather, the truss structure 70 with its truss rod could be used to pull it into the desired arch. The object of arching the pipe is so that it will automatically drain and it will not freeze and crack in wintertime. But regardless of how much arch is used in the pipe, it is desirable that the end 72 of the pipe that fits into the boxes, shown in FIG. 3, be relatively straight. Otherwise, when the pipe twists due to the towers going up or down hill, if the portion 72 inside the boxes, at the right end in FIG. 5, was arched, the arch would tend to twist somewhat into the horizontal plane which would cause an inaccurate reading by the flexible joint 32. Thus some four to five feet at one end of the pipe, at the right end 24 in FIG. 5, has been prebent, as at the point 74 so that the right end 72 is straight when the remainder of the pipe is arched up. Thus twisting of the pipe as the towers move over unlevel terrain does not cause an inaccurate reading at the flexible joint. And this straight part or section 72 is used in all of the pipe spans. Also, the straight piece 72 is more or less directly aligned with the other end of the pipe where it fits into the joint. As shown in FIGS. 5 and 6, the pipe section 20 may be made in sections flanged together or one continuous piece.

The use, operation and function of the invention are as follows:

In center pivot irrigation systems, individual pipe units are joined end to end with towers rigidly connected to each pipe section adjacent the outer end thereof so that the free end, which is inboard, of one pipe section is articulatedly connected to the tower end, which is outboard, of another. The pipe ends must be joined so as to give free articulation, since the towers will be individually going over uneven terrain and while one is going uphill, the next one or two, either inboard or outboard, may be going downhill. Thus it is desirable that the individual pipe units be free to rotate or twist about their own axis without that twist or rotation being passed on to the pipe sections on each side. In addition, the angulation of one pipe section relative to the next inboard of it, either forward or backward, should be such as to energize the self-propelled tower inboard so that the system may be rotated in either direction. Also, general alignment should be maintained with possibly a slightly forward arc in the direction of movement so that the outer component or thrust applied to the center pivot is reduced or eliminated.

It is difficult to allow the pipe end of one unit to twist or turn about its own axis, because its tower is going uphill or downhill, but at the same time to provide accurate response of the sensing mechanism due to a certain amount of angulation between adjacent pipe sections, without going to the expense of precision machine fits which is prohibitive for agricultural irrigation systems.

In the arrangement shown, two spaced boxes are used, each being fabricated and inexpensive. The sides of the boxes fit quite snugly against the sides of the pipe, but at the same time the pipe is not connected to either of the boxes so that the pipe may rotate freely within the boxes about the pipe axis without that rotation or twist being passed on to the next adjacent inboard pipe unit. While spaced boxes have been shown, it should be understood that one continuous sleeve-type unit might be used which could be fabricated. But there is no need to use the extra metal when two spaced supports will fully perform or function as the equivalent of a single elongated unit.

It is quite important that any attempted horizontal angulation of one pipe be transmitted quite accurately through the space boxes or sleeves so as to operate the sensing mechanism or gimbal ring for the drive motor on the tower for the next adjacent inboard pipe unit. And this is particularly true in a reversable unit which is intended to rotate sometimes one way and sometimes the other around a field. In the arrangement shown, the pipe is horizontally snug in the boxes, regardless of which way the machine moves, so even if the center pivot unit oscillates, there will be no looseness or backlash which will cause problems when the unit reverses direction. And, at the same time, one pipe unit is radially interconnected to the next by the lugs 64 and 66.

While a preferred form and several variations of the invention have been shown and suggested, it should be understood that suitable additional modifications, changes, substitutions and alterations may be made without departing from the invention's fundamental theme.

The embodiments of the invention in which an exclusive property or privilege is claimed are defined as follows:

1. In a pipe joint for flexibly joining the ends of two pipes to be used in a center pivot irrigation system wherein the ends of the two pipes are brought together in general axial alignment and somewhat spaced relation so as to articulate about a focal point on the pipe axis, a pair of extensions rigidly connected in radially spaced relation on one of the pipes 180° apart on opposite sides thereof and extending beyond the end of the pipe in diametrical alignment with the focal point, a second pair of such extensions mounted on the other pipe end and also extending therebeyond in diametrical alignment with the focal point but 90° out of phase with the first pair of such extensions, a circumferential interconnect between the extensions in the plane of the focal point and at right angles to the pipe axis, and a mounting means or the second pair of extensions effective to laterally interlock the extensions to the other pipe end at well spaced axial points while allowing relative rotation of the second pipe relative to the second pair of extensions.

2. The structure of claim 1 further characterized in that the mounting means includes fabricated boxes surrounding the other pipe end and connected to the second pair of extensions.

3. The structure of claim 1 further characterized in that the interconnect is in the form of a gimbal ring.

4. The structure of claim 1 in which the pipe ends are connected by a flexible split coupler.

5. In a center pivot irrigation system, an elongated water pipe system supported above the ground and pivotable about a center pivot, the system being made up of a plurality of individual pipe units flexibly connected end-to-end and extending outwardly from the center pivot, each pipe unit including an elongated rigid pipe section with a self-propelled tower rigidly connected to and supporting the pipe section adjacent one end thereof so that the tower and pipe section may rotate as a unit about the axis of the pipe section as the tower moves over unlevel ground and an elongated coupling means on the other side of the tower joining the tower end of one pipe unit to the pipe end of the next, the coupling means being constructed to axially interlock two such units to provide free rotation of one unit relative to an adjacent unit about the pipe axis with some but limited vertical angulation and substantially no horizontal angulation between the pipe end and the coupling means.

6. The structure of claim 5 further characterized in that the elongated coupling means includes two well spaced boxes interconnected by side straps with the pipe end of one unit passing through the boxes and the straps thereof being connected to an adjacent unit.

7. The structure of claim 6 further characterized by and including vertical abutments on the pipe section between the boxes and positioned to bear against the adjacent sides of the boxes.

8. The structure of claim 6 further characterized by and including a sensing mechanism at the coupling means responsive to horizontal angulation of a pipe unit relative to the next adjacent pipe unit toward the pivot to control operation of the self-propelled tower in the next adjacent pipe unit.

9. The structure of claim 8 further characterized by and including a flexible split coupling surrounding and sealing the opposed ends of two pipe sections and constructed to allow substantial angulation of the pipe sections relative to each other both horizontally and vertically.

10. In a center pivot irrigation system, an elongated water pipe system supported above the ground and pivotable about a center pivot, the system being made up of a plurality of individual pipe units flexibly connection end-to-end and extending outwardly from the center pivot, each pipe unit including an elongated rigid pipe section with a self-propelled tower rigidly connected to and supporting the pipe section adjacent one end thereof so that the tower and pipe section may rotate as a unit about the axis of the pipe section as the tower moves over unlevel ground, and an elongated coupling means on the other side of the tower joining the tower end of one pipe unit to the pipe end of the next, the coupling means being constructed to axially interlock two such units to provide free rotation of one unit relative to an adjacent unit about the pipe axis with some but limited vertical angulation and substantially no horizontal angulation between the pipe end and the coupling means the pipe section being slightly arched vertically between its ends with a generally straight portion at the pipe end thereof fitting into the coupling means of the next pipe unit.

11. For use in a center pivot irrigation system in which an elongated water pipe system is supported above the ground and pivotable about a center pivot, a pipe unit including an elongated rigid pipe section with a self-propelled tower rigidly connected to one end thereof constructed to support the pipe section above the ground when coupled to a plurality of such pipe units in end-to-end relation extending outwardly from a center pivot, and an elongated coupling means on the said one end of the pipe section constructed to axially interlock with the pipe end of an adjacent unit to provide free rotation of one unit relative to an adjacent unit about the pipe axis and providing limited vertical angulation and substantially no horizontal angulation between the pipe end and the coupling means.

12. For use in a center pivot irrigation system in which an elongated water pipe system is supported above the ground and pivotable about a center pivot, a pipe unit including an elongated rigid pipe section slightly arched in a vertical direction and throughout most of its length and with a self-propelled tower rigidly connected to one end thereof constructed to support the pipe section above the ground when coupled to a plurality of such pipe units in end-to-end relation extending outwardly from a center pivot, a coupling means on the said one end of the pipe section constructed to axially interlock with the pipe end of an adjacent section to provide free rotation of one section relative to an adjacent section about the pipe axis, and a generally straight portion of pipe on the pipe end of the pipe section adapted to fit into the coupling of the next adjacent pipe section.

13. The structure of claim 12 in which the coupling means is axially elongated and provides limited vertical angulation and substantially no horizontal angulation between the pipe end and the coupling means.

14. The structure of claim 13 further characterized in that the elongated coupling means includes two well spaced boxes interconnected by side straps with the pipe end of one unit passing through the boxes and the straps thereof being connected to an adjacent unit.

15. The structure of claim 14 further characterized by and including vertical abutments on the pipe section between the boxes and positioned to bear against the adjacent sides of the boxes.

16. The structure of claim 14 further characterized by and including a sensing mechanism at the coupling means responsive to horizontal angulation of a pipe unit relative to the next adjacent pipe unit toward the pivot to control operation of the self-propelled tower in the next adjacent pipe unit.

17. The structure of claim 16 further characterized by and including a flexible split coupling surrounding and sealing the opposed ends of two pipe sections and constructed to allow substantial angulation of the pipe sections relative to each other both horizontally and vertically.

18. For use in a center pivot irrigation system in which an elongated water pipe system is supported above the ground on self-propelled towers and is pivotable about a center pivot, a pipe unit including an elongated rigid pipe section slightly arched in a vertical direction throughout most of its length so that it will drain and substantially straight in a horizontal direction, a truss structure along the pipe section for supporting its free span, and a portion of pipe at one end thereof which is straight both vertically and horizontally and is adapted to fit into a coupling means on the next adjacent pipe unit.

* * * * *